US007490421B1

(12) United States Patent
Pletzer et al.

(10) Patent No.: US 7,490,421 B1
(45) Date of Patent: Feb. 17, 2009

(54) METHOD AND CONSTRUCTION MACHINE FOR PRODUCING GROUND SURFACES

(75) Inventors: Georg Pletzer, Berlin (DE); Joachim Waegner, Waltrop (DE); Heinrich Lackenberg, Selm (DE)

(73) Assignee: Herrn Georg Pletzer, Bochum (DE)

( * ) Notice: Subject to any disclaimer, the term of this patent is extended or adjusted under 35 U.S.C. 154(b) by 0 days.

(21) Appl. No.: 10/049,925

(22) PCT Filed: Jul. 13, 2000

(86) PCT No.: PCT/EP00/06660

§ 371 (c)(1),
(2), (4) Date: Sep. 21, 2004

(87) PCT Pub. No.: WO01/14648

PCT Pub. Date: Mar. 1, 2001

(30) Foreign Application Priority Data

Aug. 21, 1999 (DE) ................................ 199 39 796

(51) Int. Cl.
*E02F 5/00* (2006.01)
*A01B 63/112* (2006.01)

(52) U.S. Cl. ............................ 37/382; 172/4.5; 172/10; 701/50

(58) Field of Classification Search ................... 37/348, 37/382, 907; 172/4.5, 10; 60/414, 416; 701/50
See application file for complete search history.

(56) References Cited

U.S. PATENT DOCUMENTS 4,367,624 A 1/1983 Mutou et al.
4,763,473 A 8/1988 Ziplies et al.
5,333,533 A 8/1994 Hosseini
5,361,211 A * 11/1994 Lee et al. ...................... 701/50
5,447,094 A 9/1995 Geyler
5,513,491 A 5/1996 Broenner et al.
5,609,089 A 3/1997 Leidinger
5,784,812 A 7/1998 Leidinger et al.
5,855,159 A 1/1999 Yoshida et al.
6,050,090 A * 4/2000 Tohji ........................... 60/421
6,061,617 A * 5/2000 Berger et al. .................. 701/50
6,131,687 A 10/2000 Leidinger et al.
6,189,432 B1 * 2/2001 Colarelli et al. ............... 91/171
6,309,171 B1 10/2001 Arck et al.

(Continued)

FOREIGN PATENT DOCUMENTS

EP 0 378 129 7/1990

(Continued)

*Primary Examiner*—Thomas A Beach
(74) *Attorney, Agent, or Firm*—Pauley Petersen & Erickson

(57) ABSTRACT

A method for producing ground surfaces with a hydraulic excavator including a shovel applicable to the surface of the ground, and a lifting cylinder for lifting and lowering the excavator equipment. The lifting cylinder of the excavator equipment is actively connected with at least one work pump via a control device actuated by the operator; and whereby the lifting cylinder is lifted, lowered or blocked depending on the switching position of the control device. For compensating the weight of the excavator equipment and for adjusting an approximately constant pressure of application of the shovel to the surface of the ground as the excavator equipment is moving and working, the lifting side of the lifting cylinder, upon actuation of an actuating element, is automatically acted upon by an adjustable compensation pressure by supplying or evacuating a hydraulic medium.

11 Claims, 4 Drawing Sheets

U.S. PATENT DOCUMENTS

| | | | | |
|---|---|---|---|---|
| 6,401,856 | B1 | 6/2002 | Kohlmorgen | |
| 6,568,898 | B2 * | 5/2003 | Nishimura et al. | 414/699 |
| 6,584,769 | B1 * | 7/2003 | Bruun | 60/414 |
| 6,685,277 | B1 | 2/2004 | Kohlmorgen et al. | |
| 6,701,823 | B2 | 3/2004 | Weber et al. | |
| 6,804,957 | B2 * | 10/2004 | Bruun | 60/414 |
| 6,938,414 | B1 * | 9/2005 | Bruun | 60/414 |
| 6,951,067 | B1 * | 10/2005 | Dietz et al. | 37/348 |
| 2001/0032031 | A1 * | 10/2001 | Ufheil | 700/169 |
| 2001/0046433 | A1 * | 11/2001 | Nishimura et al. | 414/694 |
| 2006/0129296 | A1 * | 6/2006 | Ikari | 701/50 |

FOREIGN PATENT DOCUMENTS

| | | |
|---|---|---|
| EP | 0 389 136 | 9/1990 |
| EP | 0 436 740 | 7/1991 |
| EP | 0 481 120 | 4/1992 |
| EP | 0 482 237 | 4/1992 |
| JP | 07 259806 | 10/1995 |
| WO | WO 01/44668 | 12/2000 |
| WO | WO 01/86226 | 11/2001 |

* cited by examiner

METHOD AND CONSTRUCTION MACHINE FOR PRODUCING GROUND SURFACES

CROSS REFERENCE TO RELATED APPLICATIONS

Applicants claim priority under 35 U.S.C. §119 of German Application No. 199 39 796.1 filed Aug. 21, 1999. Applicants also claim priority under 35 U.S.C. §120 of PCT/EP00/06660 filed Jul. 13, 2000. The international application under PCT article 21(2) was not published in English.

The invention relaters to a method for producing ground surfaces by means of a construction machine, in particular to a hydraulic excavator, comprising excavator equipment comprised of more or more components, including a shovel that can be placed on the ground surface, and a lifting cylinder for lifting and lowering the excavator equipment; whereby the lifting cylinder of the excavator equipment is actively connected with at least one work pump that can be actuated by the excavator operator via a control device; and whereby the lifting cylinder is lifted, lowered or blocked depending on the position to which the control device is set.

Furthermore, the invention relates to a construction machine, in particular to a hydraulic excavator for constructing ground surfaces, comprising excavator equipment consisting of one component or a multitude of components, including a shovel that can be placed on the ground surface, and a lifting cylinder for lifting and lowering the excavator equipment; whereby the lifting cylinder of the excavator equipment is actively connected with at least one work pump via a control device that can be actuated by the excavator operator; and whereby the lifting cylinder can be lifted, lowered or blocked depending on the position to which the control device is switched.

Hydraulic excavators are frequently employed for the construction of level ground surfaces. It is necessary for said purpose to guide the shovel or cutting edge of the shovel across the ground surface being constructed with no or only minor force of application to surface of the ground because varying forces of application may lead to corrugations on the surface of the ground.

Due to the fact that simultaneous movements of three cylinders (lifting cylinder; stem cylinder; shovel cylinder) are required in connection with hydraulic excavators for the purpose of guiding the shovel across a level ground surface with controlled force of application to the ground, extraordinary skill is required on the part of the operator to carry out this operation with good results. If, for example, the stem of the excavator equipment is moved, the entire jib has to be lifted or lowered at the same time in order to keep the cutting edge of the shovel on the level surface of the ground. When the stem and the shovel are moved simultaneously, correction of the jib becomes even more complex.

Therefore, various types of construction have become known which are expected to support the operator of hydraulic excavators in the production of level ground surfaces. In addition to mechanical guides by means of parallelogram kinematics or by means of electronic track movement of the shovel, other simpler support systems have become known.

Designs are known in connection with which the lifting cylinders are switched to a so-called floating position. Both sides of the lifting cylinder are connected in this case with the tank. The inherent weight of the excavator equipment rests on the shovel, and the jib is then lifted and lowered depending on the condition of the underground. The drawback is that the weight of the entire excavator equipment is fully resting on the shovel, causing the latter to have the tendency to penetrate the ground to a deeper extent. It is not possible in this way to produce a clean, level ground surface.

Another system is shown in U.S. Pat. No. 5,855,159, in which provision is made in the lowering line of the lifting cylinder for a pressure control valve that can be switched from normal operating pressure to a selectable low pressure value. The switch is carried out by the control pressure of an auxiliary pump acting on the adjustment of the pressure control valve. The effect of the system is that the shovel is capable of yielding in the lifting direction due to digging forces because the hydraulic oil drains from the cylinder space on the side of the piston rod under lower pressure via the pressure control valve. Since no further hydraulic oil is supplied to the lifting side of the cylinder, the weight of the excavator equipment is resting on the shovel.

Said system thus does provide any support for the operator for constructing level ground surfaces because the force for lifting the excavator equipment is composed of the weight of the latter plus the remaining cylinder force on the side of the piston rod. Said forces cause the shovel to penetrate the ground.

Therefore, the problem of the invention is to provide a solution by which ground surfaces can be produced as level as possible in a simpler and faster manner with the help of construction machines, in particular with hydraulic excavators.

Said problem is solved according to the invention in connection with a method of the type specified above in that for compensating the weight of the excavator equipment and for adjusting an approximately constant force of application with which the shovel rests on the ground surface as the excavator equipment is moving, working the ground, the lifting side of the lifting cylinder is automatically acted upon after an actuating element has been triggered, by feeding or evacuating a hydraulic medium with adjustable compensation pressure.

According to the invention, the force of application with which the shovel rests on the ground is thus reduced and is notably kept very low and as constant as possible, whereby such force of contact with the ground is automatically controlled for relieving the work of the operator. For said purpose, the piston side of the lifting cylinder is supplied with a suitable hydraulic medium, for example pressure oil, which compensates the weight of the excavator equipment to a great extent and in that way reduces the force of application of the shovel to the ground surface to a low value, or eliminates such force entirely. Said method relieves the operator considerably because the jib needs not to be controlled in the course of the leveling operation. Owing to such relief and the automatic control it is possible to guide the shovel across the ground surface substantially more rapidly, which increases the economy. Another advantage is that the risk of causing damage to cables and pipelines is reduced.

The compensation pressure for compensating the weight can be supplied in different ways. For example, the compensation pressure can be generated by an additional pump or by the work pump itself.

Furthermore, the method can be improved further by monitoring the position of the point of gravity of the excavator equipment and automatically adapting the compensation pressure if the point of gravity shifts.

In order to make it possible for the operator to intervene manually, if need be, provision is made, furthermore, that the application of compensation pressure is shut off when the control device is actuated by the operator.

For solving the problem specified above, the invention, furthermore, makes provision for a construction machine, in particular for a hydraulic excavator that is characterized in that for compensating the weight of the excavator equipment, and for adjusting an approximately constant force with which the shovel rests on the ground surface as the excavator equipment is being operated, the lifting side of the lifting cylinder is connected via a switchable actuating element with a system for feeding or evacuating hydraulic medium for supplying a compensation pressure that can be adjusted to a constant value.

In connection with a first embodiment of the construction machine, provision is made that the system for feeding and evacuating hydraulic medium is comprised of a valve, which is realized in the form of a control slide installed in parallel with the control device; an auxiliary pump; and a tank, whereby the valve supplies the compensation pressure generated by the auxiliary pump to the lifting side of the lifting cylinder and connects the lowering side o the lifting cylinder with the tank, whereby the pressure of the auxiliary pump can be adjusted.

If the valve, for example a 4/2-way valve, is switched by the operator via the actuating element to the operating position "leveling", which can be set either for continuous leveling via a switch or for leveling for a short time via a key, the 4/2-way valve feeds the pressure of the auxiliary pump into the lifting conduit of the lifting cylinder between the control slide and the lifting cylinder. The lowering conduit is connected with the tank by the 4/2-way valve. The control slide remains closed during this operation.

So as to be able to adjust the compensation pressure, provision is advantageously made that the pressure of the auxiliary pump can be adjusted via a pressure control valve. Said pressure control valve can be adjusted to difference pressure values via a selector switch. Via the selector switch, the operator sets a pressure of such a value that almost completely compensates the weight of the excavator equipment. The leveling work is carried out with the control slide in the zero position; the lifting cylinder of the jib needs not to be controlled during leveling; and the auxiliary pump and the pressure control valve assure that the excavator equipment is always supported on the ground surface via the shovel with the force selected for its application to the surface of the ground. The point of gravity of the excavator equipment does in fact shift due to the movement of stem and the shovel, so that changes may occur in the force with which the shovel is in contact with the ground. Such changes, however, are minor.

Instead of using an auxiliary pump with a pressure control valve, it is possible also to make provision for an alternative by providing the auxiliary pump in the form of an adjustable, pressure-controlled servo-pump in order to replace the pressure control valve and to avoid energy losses.

For serving energy, it is possible to switch the pressure control valve or pressure-regulated servo-pump to pressureless operation or zero delivery when the switches are turned off.

In a second embodiment of the construction machine, provision is made that the device serving for supplying and evacuating the hydraulic medium is formed by the work pump, and that the control device designed in the form of a control slide and actuated by a manual control valve can be separated from the valve by means of a valve and switched to the lifting position via the constant pressure of a control pump; and, furthermore, that a pressure control valve is installed in the conduit leading from the control slide to the lifting side of the lifting cylinder, in a manner such that the compensation pressure can be supplied by the work pump. When the leveling operation is switched on by the excavator operator, the control slide is continuously switched to lifting via a valve. A simultaneously activated pressure control valve, which is installed in the lifting conduit between the control slide and the lifting side of the lifting cylinder, controls the pressure in such a way that the weight of the excavator equipment is almost fully compensated. The lowering side of the lifting cylinder is connected then with the tank via the control slide. At the same time, the work pump is switched to a predetermined reduced amount of delivery by a pressure reduction valve installed in the control line leading to the work pump.

Provision is made for a selector switch that can be actuated by the operator, so that the compensation pressure can be set by the operator in a simple manner.

Any shift in the point of gravity occurring in the course of the leveling operation due to the movement of the stem changes the force with which the shovel is applied to the ground. So that said force can be exactly maintained at a constant level, provision is made for a measuring instrument for detecting the shift in the point of gravity of the excavator equipment, for example for a potentiometer detecting the angular position of the stem, which is provided in a control line leading to the pressure control valve or pressure-regulated servo-pump. Such a measuring instrument supplies the pressure control valve or pressure-regulated servo-pump with a modulated control signal in order to change the compensation pressure in such a way that the force of application of the shovel to the surface of the ground is kept constant as the latter is working the surface.

The invention is explained in greater detail in the following by way of example with the help of the drawing. In the drawing, FIG. 1 shows a first embodiment of a construction as defined by the invention, with an auxiliary pump and pressure control valve.

Figure 1:
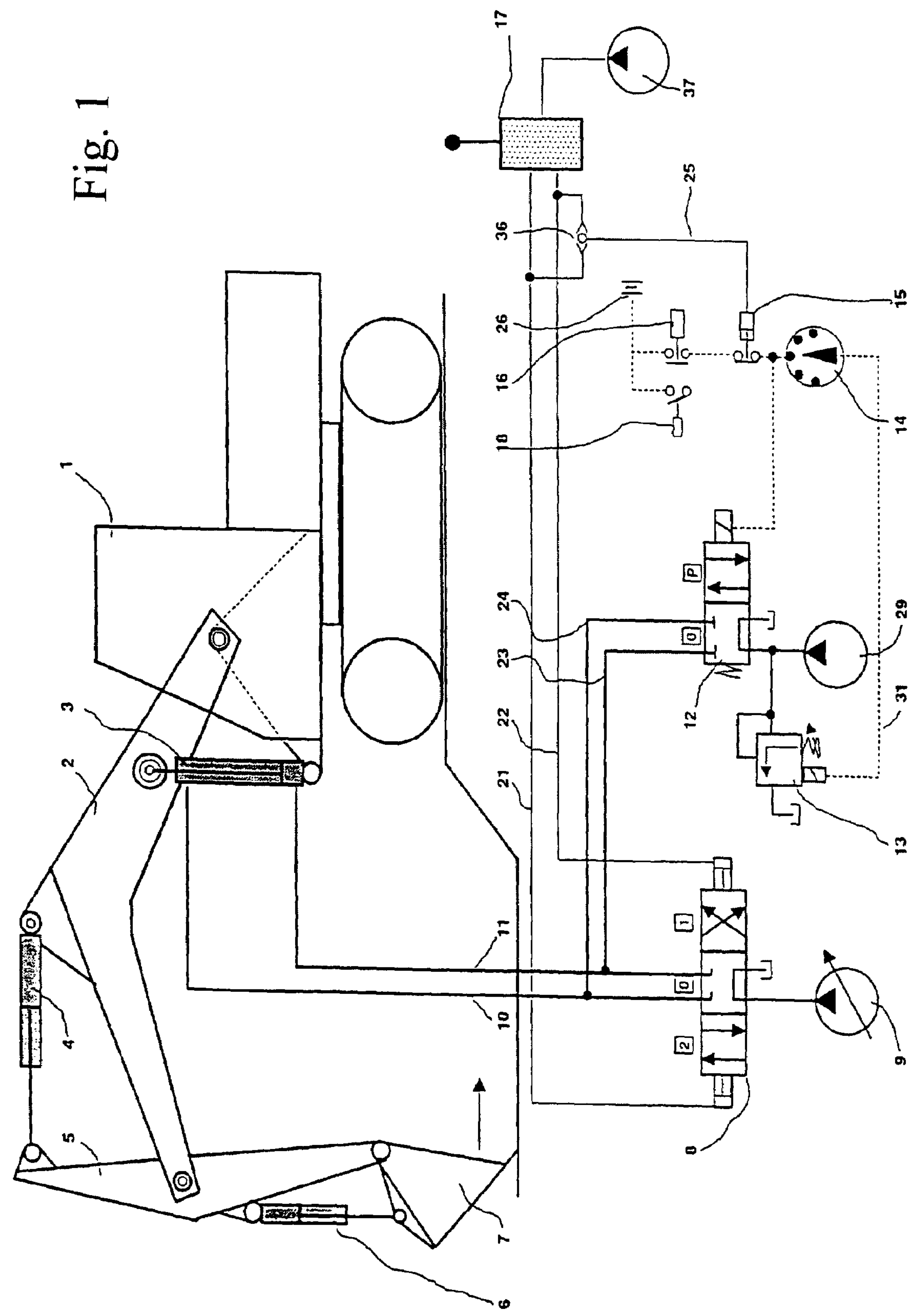

FIG. 1 shows a construction machine, specifically a hydraulic excavator, which is generally denoted by 1. Said hydraulic excavator 1 is equipped with excavator equipment comprised of a jib 2, a lifting cylinder 3, a stem cylinder 4, a stem 5, a shovel cylinder 6, and a shovel 7.

The lifting cylinder 3 is connected to a control device in the form of a control slide 8 via the lines 10, 11, whereby the control slide is blocking the lifting cylinder 3 when it is set in position 0; lifting the excavator equipment when it is set in position 1; and lowering the excavator equipment when it is set in position 2.

For supplying the control slide 8 with a hydraulic medium, provision is made for a work pump 5, which is usually employed for other operational functions of the hydraulic excavator 1 as well. The control slide 8 is actuated by the operator by means of a manual control valve 17 that is supplied by a control pump 37 via the lines 21, 22.

A 4/2-way valve 12 is arranged parallel with the control slide 8. When in the idle position (0), said 4/2-way valve is blocking the lines 23, 24 and connecting an auxiliary pump 29 with the tank. When set to the switching position P, the valve 12 is connecting the auxiliary pump 29 with the lifting side of the lifting cylinder 3 via the line 23 and the line 11, whereas the lowering side of the lifting cylinder 3 is connected with the tank via the line 10 and the line 24. The valve 12 is switched on by a voltage source 26 via a switch 18 or a key 16. The pressure of the auxiliary pump 29 can be adjusted via a pressure control valve 13, which can be controlled in preset ranges by means of a selector switch 14.

Downstream of the switches 16, 18, which are connected in parallel, provision is made for a switch 15, which breaks the power supply as soon as the manual control valve 17 is actuated. Said manual control valve actuates the switch 15 via a reversing valve 36 and via a line 25. The weight compensation explained in greater detail below is switched off in this way and the pressure control valve 13 is set to pressureless passage.

Figure 2:
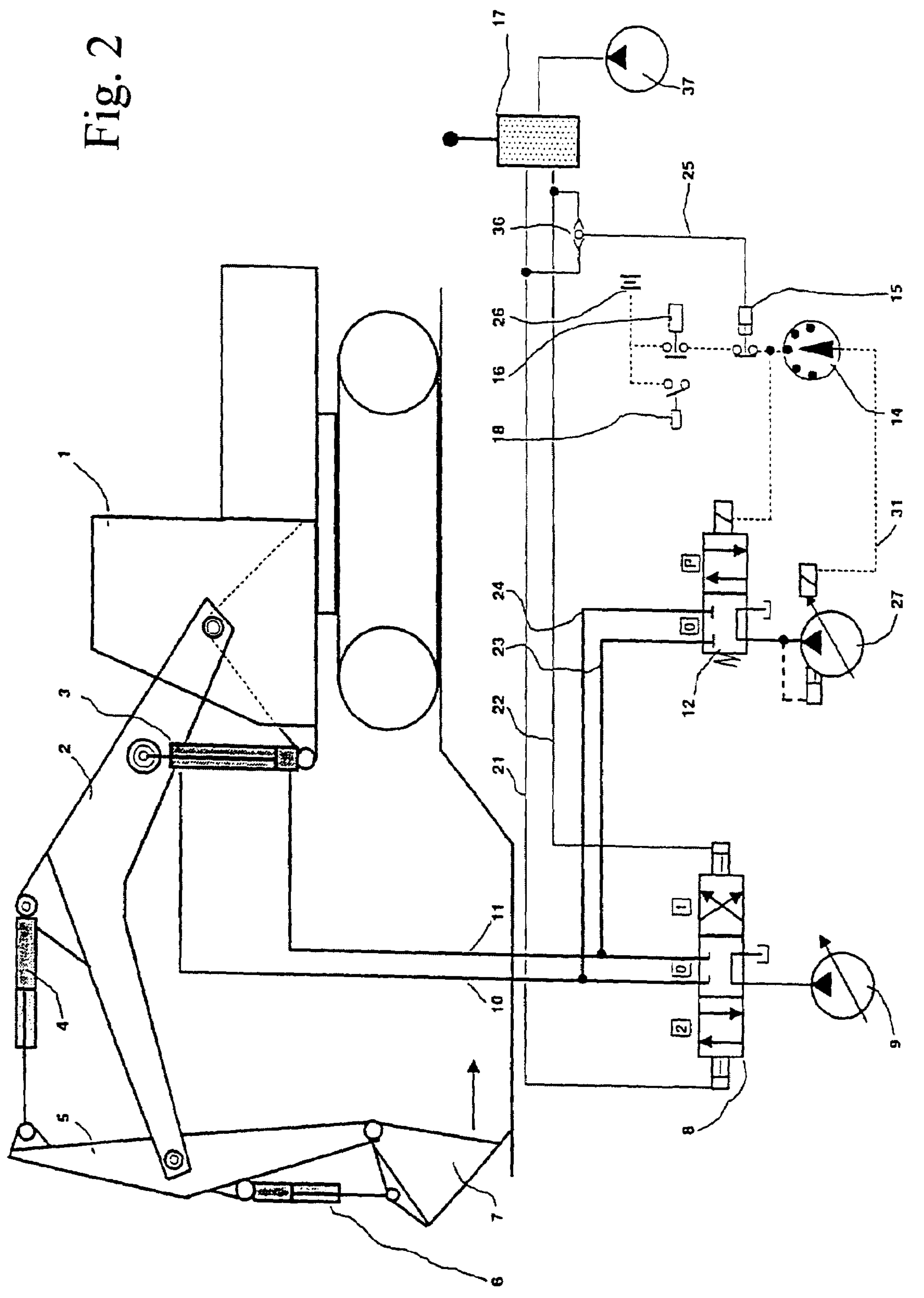
FIG. 2 shows a second embodiment with a pressure-regulated servo-pump.

The embodiment according to FIG. 2 is different from the one according to FIG. 1 in that provision is made for a pressure-regulated servo-pump 27 replacing the pressure control valve 13 and the auxiliary pump 29. The pressure of the pressure-regulated servo-pump 27 is controlled via a line 31 by means of the selector switch 14, and the pump 27 is switched to zero delivery as soon as the switch 15 breaks the power supply.

Figure 3:
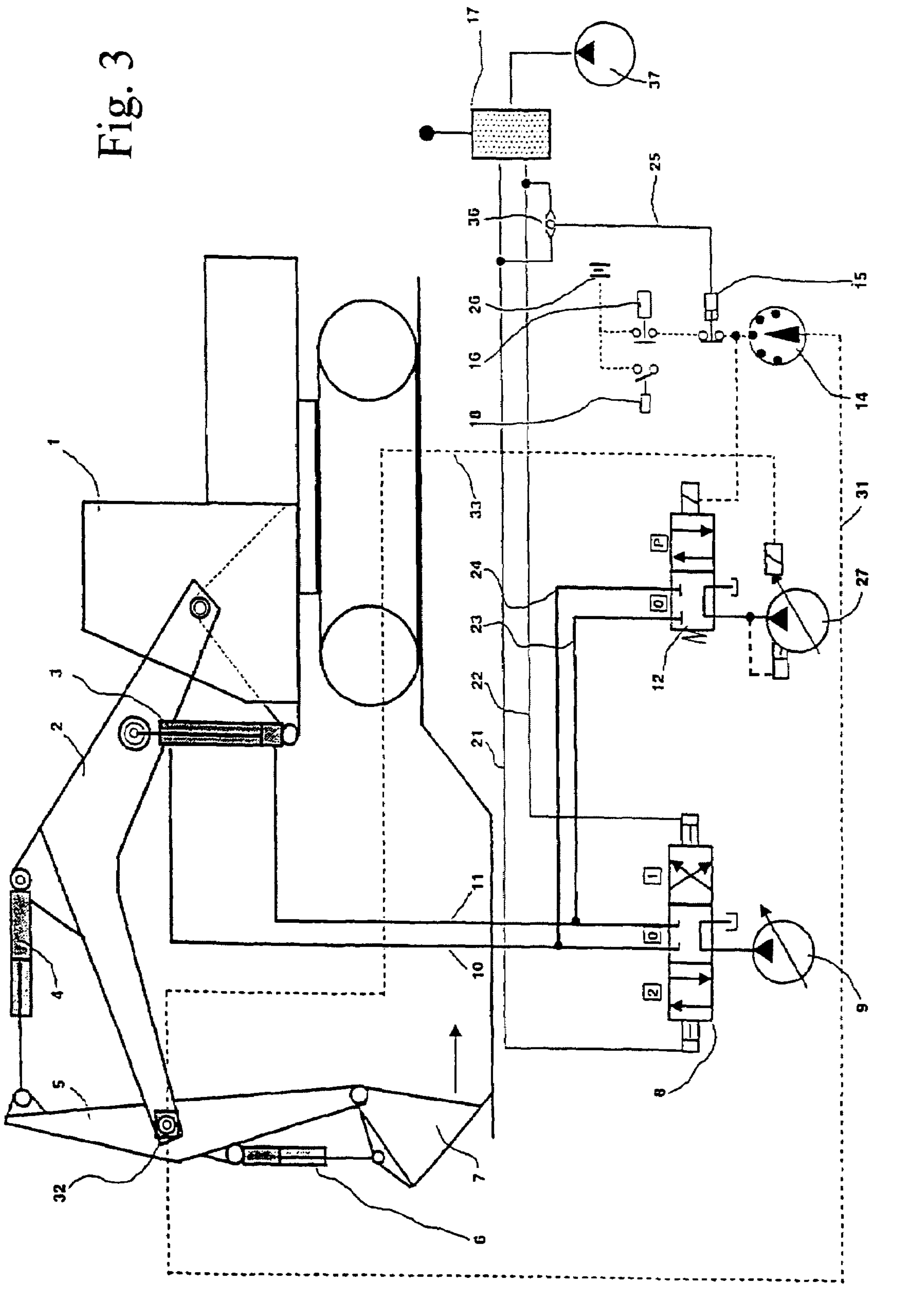
FIG. 3 shows the embodiment according to FIG. 2 with an additional measuring system for supplying a constant force of application of the shovel.

FIG. 3 shows the hydraulic excavator 1 according to FIG. 2 with an additional measuring instrument 32, which is installed in a control line 31. The measuring instrument 32 is, for example a potentiometer and measures the angular position between the stem 5 and the jib 2. Depending on the position of the stem 5, the signal for the pressure control valve 13 or the pressure-regulated servo-pump 27 is modulated by the measuring device 32 via a line 33 in such a way that the force of application of the shovel 7 to the ground surface can be maintained at a constant level.

Figure 4:
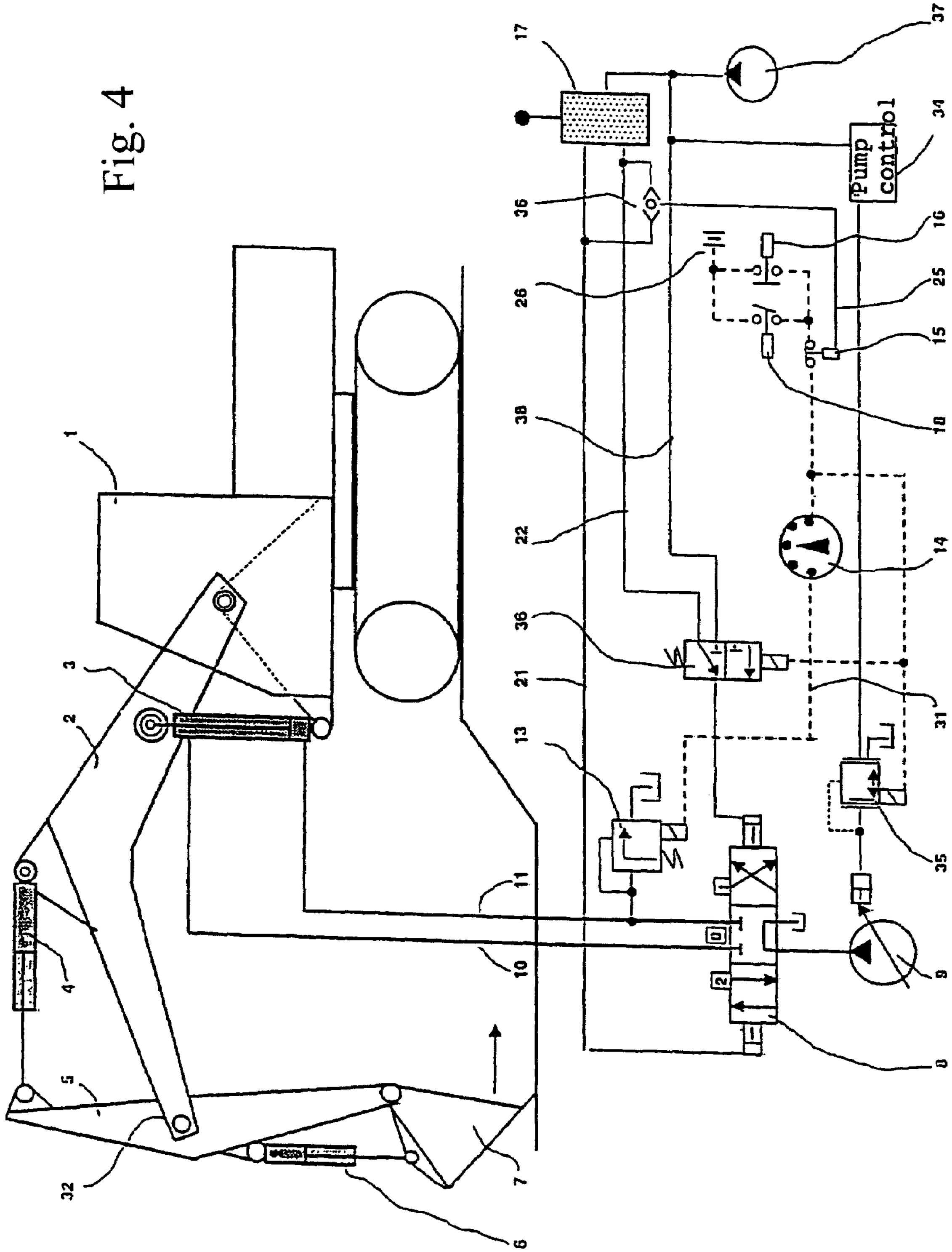
FIG. 4 shows another embodiment of the construction machine without the auxiliary pump, in which the work pump supplies the weight compensation.

FIG. 4 shows another embodiment of a hydraulic excavator as defined by the invention, whereby the same reference numerals are used as in the preceding figures to the extent such numerals denote identical components.

As opposed to the embodiments described above, provision is made in the hydraulic excavator 1 according to FIG. 4 for the work pump 9 serving as the pressure source for the compensation of the weight. The pressure control valve 13 is therefore connected to the line 11 leading to the lifting side of the lifting cylinder 3. When the switch 16 or 18 is actuated, a 3/2-way valve 36 shuts off the manual control valve 17 and connects the constant pressure of the control pump 37 to the switching side of the control slide via a line 38, which causes said switching side to switch on the lifting operation of the lifting cylinder 3 of the jib 2.

Furthermore, the signal of the switches 16, 18 effects the activation of the pressure control valve 13 via a selector switch 14, as well as the reduction of the delivery of the pump 9 by means of a pressure reduction valve 35, which modulates the signal of the pump control 34 in such a way that a preset volume of delivery of the work pump is made available. When the manual control valve 17 is actuated, the weight compensation is shut off by the switch 15 via a reversing valve 36 and the line 25, and the control of the control slide 8 by means of the manual control valve 17 is re-established.

The mode of operation of the hydraulic excavators 1 described above for producing an approximately level ground surface is described as follows:

If the hydraulic excavator 1 is to be employed for leveling work or similar work operations, the operator switches the switch 18, or for short work operations actuates the key 16 and thus the valve 12 to position (P), or the valve 36. At the same time, the operator pre-selects the force of application of the shovel 7 by means of the selector switch 14. The lifting side of the lifting cylinder 3 is now connected with the activated pressure control valve 13 or the pressure-regulated servo-pump 27 and supports the jib 2 to the selected extent. For leveling work, the operator then moves only the stem and the shovel 7; the jib 2 is automatically adjusted in such a way that the weight compensation system maintains the selected value.

If the weight compensation is selected in such a way that the shovel 7 rests on the plane surface of the ground with only very low force, the method of the invention results in the following operational sequences:

If the shovel 7 is driven over a ground surface in such a way that the jib 2 has to be lifted in order to follow the contour of the surface, such a movement increases the force of application of the shovel 7 to the ground. Any slight increase in the application force effects an immediate automatic lifting of the jib 2 by a measure such that the shovel 7 will continue to rest on the surface of the ground with the selected low force of application. Owing to the fact that the auxiliary pump 29 or work pump 9 is permanently connected with the lifting surface of the lifting cylinder 3, the pressure oil required for lifting the jib 2 is always available. If the shovel 7 is moved over the surface of the ground in such a way that the jib 2 has to be lowered, the latter is lowered automatically as soon as the shovel loses contact with the ground, and the adjusted force of application supplies the force required for lowering the jib. The hydraulic oil then drains from the lifting side of the lifting cylinder 3 via the pressure control valve 13, whereas the lowering side is connected with the tank and capable of sucking in more hydraulic oil.

In this way, the shovel 7 is automatically following the contour of the surface of the ground with nearly constant force of application to the ground.

It is not necessary in the course of the operations described above to actuate the actual control slide 8 of the lifting cylinder 3; said control slide can remain in the blocking position. If the control slide 8 is additionally switched on by the operator with the manual control valve 17 via the line 22 as the weight compensation is switched on and operating, the weight compensation is interrupted and the jib 2 can be controlled by the operator.

The invention claimed is:

1. A method for producing ground surfaces by means of a construction machine, in particular a hydraulic excavator with an excavator comprised of one single or a multitude of components including a shovel applicable to the surface of the ground, and a lifting cylinder for lifting and lowering the excavator equipment; whereby the lifting cylinder of the excavator equipment is actively connected with at least one work pump via a control device actuated by the operator; and whereby the lifting cylinder is lifted, lowered or blocked depending on the switching position of the control device; wherein for compensating the weight of the excavator equipment and for adjusting an approximately constant pressure of application of the shovel to the surface of the ground as the excavator equipment is moving and working, the lifting side of the lifting cylinder, upon actuation of an actuating element, is automatically acted upon by an adjustable compensation pressure by supplying or evacuating a hydraulic medium, wherein the admission of the compensation pressure is terminated upon actuation of the control device by the operator.

2. The method according to claim 1, wherein the compensation pressure is generated by an additional pump.

3. The method according to claim 1, wherein the compensation pressure is generated by the work pump.

4. The method according to claim 1, wherein the position of the point of gravity of the excavator equipment is monitored and the compensation pressure is automatically adapted to any shift in the position of the point of gravity.

5. A construction machine, in particular a hydraulic excavator for producing ground surface with excavator equipment comprising one or more components, including a shovel (7) applicable to the ground surface, and a lifting cylinder (3) for lifting and lowering the excavator equipment, whereby the lifting cylinder (3) of the excavator equipment is actively connected with at least one work pump (9) via a control device (8) actuated by the operator, and whereby the lifting cylinder (3) can be lifted, lowered or blocked depending on the switching position of the control device (8); wherein for compensating the weight of the excavator equipment and for adjusting an approximately constant force of application of the shovel (7) to the surface of the ground, the lifting side of the lifting cylinder (3) is connected via a switchable actuating element (16, 18) with a system for supplying and evacuating hydraulic medium for admitting a constant, adjustable compensation pressure, wherein the device for supplying and evacuating hydraulic medium is formed by the work pump (9) and the control device designed in the form of a control slide (8) and actuated by a manual control valve (17) can be separated from the manual control valve (17) by means of a valve (36) and switched to the lifting position via the constant pressure of a control pump (37); and that a pressure control valve (13) is installed in the line (11) leading from the control slide (8) to the lifting side of the lifting cylinder (3), in a way such that the compensation pressure can be supplied by the work pump (9).

6. A construction machine, in particular a hydraulic excavator for producing ground surface with excavator equipment comprising one or more components, including a shovel (7) applicable to the ground surface, and a lifting cylinder (3) for lifting and lowering the excavator equipment, whereby the lifting cylinder (3) of the excavator equipment is actively connected with at least one work pump (9) via a control device (8) actuated by the operator, and whereby the lifting cylinder (3) can be lifted, lowered or blocked depending on the switching position of the control device (8); wherein for compensating the weight of the excavator equipment and for adjusting an approximately constant force of application of the shovel (7) to the surface of the ground, the lifting side of the lifting cylinder (3) is connected via a switchable actuating element (16, 18) with a system for supplying and evacuating hydraulic medium for admitting a constant, adjustable compensation pressure, wherein the system for supplying or evacuating hydraulic medium comprises a valve (12) arranged parallel with the control device designed in the form of a control slide (8); an auxiliary pump (29); and a tank; whereby the valve (12) delivers the compensation pressure generated by the auxiliary pump (29) to the lifting side of the lifting cylinder (3), and connects the lowering side of the lifting cylinder (3) with the tank; and whereby the pressure of the auxiliary pump (29) is adjustable.

7. The construction machine according to claim 5, wherein provision is made for a selector switch (14) for adjusting the compensation pressure.

8. The construction machine according to claim 6, wherein the pressure of the auxiliary pump (29) can be adjusted via a pressure control valve (13).

9. The construction machine according to claim 6, wherein the auxiliary pump is an adjustable, pressure-regulated servo-pump (27).

10. The construction machine according to claim 6, wherein provision is made for a selector switch (14) for adjusting the compensation pressure.

11. A construction machine, in particular a hydraulic excavator for producing ground surface with excavator equipment comprising one or more components, including a shovel (7) applicable to the ground surface, and a lifting cylinder (3) for lifting and lowering the excavator equipment, whereby the lifting cylinder (3) of the excavator equipment is actively connected with at least one work pump (9) via a control device (8) actuated by the operator, and whereby the lifting cylinder (3) can be lifted, lowered or blocked depending on the switching position of the control device (8); wherein for compensating the weight of the excavator equipment and for adjusting an approximately constant force of application of the shovel (7) to the surface of the ground, the lifting side of the lifting cylinder (3) is connected via a switchable actuating element (16, 18) with a system for supplying and evacuating hydraulic medium for admitting a constant, adjustable compensation pressure, wherein provision is made in a control line (31) leading to the pressure control valve (13) or to the pressure-regulated servo-pump (27) for a measuring instrument for detecting any shift in the position of the point of gravity of the excavator equipment, said measuring instrument supplying a modulated control signal to the pressure control valve (13) or to the pressure-regulated servo-pump (27) in order to change the compensation pressure in such a way that the force of application of the shovel (7) remains constant as the latter is moving and working.

* * * * *